US 8,817,933 B2

(12) United States Patent
Mehta et al.

(10) Patent No.: US 8,817,933 B2
(45) Date of Patent: Aug. 26, 2014

(54) METHOD AND APPARATUS FOR CLOCK DATA RECOVERY FROM MANCHESTER CODED SERIAL DATA STREAM

(71) Applicants: Darshini H. Mehta, Grafton, WI (US); Alan Campbell, New Berlin, WI (US)

(72) Inventors: Darshini H. Mehta, Grafton, WI (US); Alan Campbell, New Berlin, WI (US)

(73) Assignee: Rockwell Automation Technologies, Inc., Mayfield Hts., OH (US)

( * ) Notice: Subject to any disclaimer, the term of this patent is extended or adjusted under 35 U.S.C. 154(b) by 12 days.

(21) Appl. No.: 13/737,055

(22) Filed: Jan. 9, 2013

(65) Prior Publication Data
US 2014/0192929 A1    Jul. 10, 2014

(51) Int. Cl.
*H04L 7/02*    (2006.01)
*H04L 25/02*   (2006.01)

(52) U.S. Cl.
CPC ..................................... *H04L 25/02* (2013.01)
USPC ........... 375/361; 375/316; 375/354; 375/356; 375/357; 375/359; 375/360

(58) Field of Classification Search
CPC ......... H04L 7/00; H04L 7/0066; H04L 7/033; H04L 7/046
USPC .......... 375/361, 316, 354, 356, 357, 359, 360
See application file for complete search history.

(56) References Cited

U.S. PATENT DOCUMENTS

| | | | |
|---|---|---|---|
| 3,923,439 A | 12/1975 | Isley et al. | |
| 5,600,634 A | 2/1997 | Satoh et al. | |
| 5,917,721 A | 6/1999 | Kerkman et al. | |
| 5,990,658 A | 11/1999 | Kerkman et al. | |
| 6,081,561 A * | 6/2000 | Julyan et al. | 375/340 |
| 6,369,613 B1 | 4/2002 | Costello et al. | |
| 6,583,591 B2 | 6/2003 | Echols et al. | |
| 6,936,989 B2 | 8/2005 | Hogan | |
| 7,005,821 B2 | 2/2006 | Sunaga et al. | |
| 7,061,202 B2 | 6/2006 | Sunaga et al. | |
| 7,342,380 B1 | 3/2008 | Kerkman et al. | |
| 7,734,940 B2 | 6/2010 | Yamazaki | |
| 7,738,267 B1 | 6/2010 | Tallam et al. | |
| 7,847,528 B2 | 12/2010 | Li et al. | |
| 7,923,944 B2 | 4/2011 | Schulz et al. | |
| 8,072,174 B2 | 12/2011 | Campbell et al. | |
| 8,080,965 B2 | 12/2011 | Campbell et al. | |
| 8,159,274 B2 | 4/2012 | Lin et al. | |
| 8,188,694 B2 | 5/2012 | Tallam et al. | |
| 8,212,514 B2 | 7/2012 | Campbell et al. | |
| 8,248,009 B2 | 8/2012 | Campbell et al. | |
| 8,400,791 B2 * | 3/2013 | Campbell et al. | 363/34 |
| 2010/0123425 A1 | 5/2010 | Campbell et al. | |
| 2012/0013284 A1 | 1/2012 | Campbell | |
| 2012/0013372 A1 | 1/2012 | Campbell et al. | |
| 2012/0221908 A1 * | 8/2012 | Whetsel | 714/727 |
| 2013/0343248 A1 * | 12/2013 | Toner et al. | 370/311 |

* cited by examiner

*Primary Examiner* — Siu Lee

(74) *Attorney, Agent, or Firm* — Fay Sharpe LLP

(57) ABSTRACT

Methods and apparatus are presented for obtaining clock data from Manchester coded serial data streams, in which received data is sampled at a sample rate higher than the serial data baud rate, multi-bit groups of transition bits are generated which individually indicate data transition locations in a corresponding multi-bit sampled data bit group, and clock data is derived using the multi-bit groups of transition bits without requiring receipt of synchronization data or receipt of a separate clock.

20 Claims, 9 Drawing Sheets

FIG. 7

TransReg corresponding to Encoded "00" i.e. "0101" or "11" i.e. "1010"

| 5 Bits Away | 6 Bits Away | 7 Bits Away |
|---|---|---|
| 0100 0010 0001 | 0100 0000 0100 0001 | 0100 0000 1000 0001 |
| 1000 0100 0010 | 0010 0000 1000 0010 | 1000 0001 0000 0010 |
| 0001 0000 1000 0100 | 0100 0001 0000 0100 | 0001 0000 0010 0000 0100 |
| 0010 0001 0000 1000 | 1000 0010 0000 1000 | 0010 0000 0100 0000 1000 | t → 101

FIG. 8

TransReg corresponding to encoded "01" i.e. "0110" or "10" i.e. "1001"

| 11 Bits Away | 12 Bits Away | 13 Bits Away |
|---|---|---|
| 103 --- 1000 0000 0001 | 0001 0000 0000 0001 | 0010 0000 0000 0001 |
| 0001 0000 0000 0010 | 0010 0000 0000 0010 | 0100 0000 0000 0010 |
| 0010 0000 0000 0100 | 0100 0000 0000 0100 | 1000 0000 0000 0100 |
| 0100 0000 0000 1000 | 1000 0000 0000 1000 | 0001 0000 0000 0000 1000 | t → 104

METHOD AND APPARATUS FOR CLOCK DATA RECOVERY FROM MANCHESTER CODED SERIAL DATA STREAM

BACKGROUND

Power conversion systems are used to generate and provide AC output power to a load, such as a single or multi-phase AC motor driven by an inverter stage of a motor drive power converter. In certain situations, it is desirable to connect two or more motor drives to provide output power to a single driven motor load. In these situations, the drives may be connected to one another and/or to a main controller by data links for exchanging timing and control information. The inverter output stages of the motor drives, moreover, are typically pulse width modulated using a triangle wave carrier, and it is desirable that the carriers used in the parallel-connected inverter outputs be synchronized to mitigate circulating currents. Accordingly, it is advantageous that exchange of carrier wave information through a digital data path between the motor drives be synchronized. However, oscillators, crystals and other digital data transfer clock sources in the various drives and controllers are typically imperfect, and the clock frequency at one device will generally be slightly different from that of another device. Moreover, these clock sources are typically not synchronized with one another, and instead non-zero phase offsets are common. In the past, the receivers at each device included clock adjustment features to adjust the receiver clock according to synchronization pulses. However, such clock adjustment and the provision of sync pulses can only achieve a certain level of synchronization between parallel-connected motor drives. Accordingly, a need remains for improved methods and apparatus for mitigating clock variations in parallel-connected motor drives to reduce the adverse effects of circulating currents.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter.

Clock data recovery techniques and apparatus are disclosed by which the foregoing and other shortcomings of conventional receiver clock adjustment approaches are mitigated or avoided. The present disclosure provides solutions for recovering clock data without the need for receipt of synchronization data (e.g., sync pulses) or separate transmission of clock pulses, by which a receiver apparatus can properly process Manchester coded serial data streams in an efficient manner, while accommodating close tolerances for synchronization offsets. Accordingly, the disclosed techniques are particularly applicable for parallel connection of multiple motor drives in which carrier waveform data and other control information is used by multiple inverter stages to drive a common motor load. Moreover, the data recovery aspects of the present disclosure find utility in association with other applications in which Manchester coded serial data streams are processed by a receiving system.

Methods are provided for deriving clock data from a Manchester coded serial data stream, including constructing multi-bit groups of transition bits that indicate transition locations in a corresponding multi-bit group of sampled bits obtained by sampling the Manchester coded serial data stream. In addition, the methods involve deriving clock data based primarily or exclusively on the multi-bit groups of transition bits. In certain implementations, the Manchester coded data stream may be quadrature sampled at a relatively high sampling frequency compared with the input baud rate in order to obtain four-bit groups (e.g., nibbles) of sampled data bits, and transition nibbles are constructed including four transition bits that indicate transition locations or positions in the corresponding data nibble. The methods do not require the use of sync pulses or other synchronization data, and can be used without separate provision of a clock signal from a transmission source. Consequently, the presently disclosed methods provide significant advantages relative to conventional techniques in which a separate data line is needed to transmit clock pulses from the transmitter, and/or where data transmission must be interrupted to provide periodic sync pulses or sync data packets. In addition, the disclosed methods may be successfully implemented in situations requiring tight tolerances for synchronizing multiple motor drives, while providing reduced processing overhead and simplified receiver configurations. Non-transitory computer readable media is also presented, with computer executable instructions for performing the disclosed clock recovery techniques.

Certain embodiments of the method further include detecting one or more patterns in the transition bit groups, and deriving the clock data based on the pattern(s). Certain implementations, moreover, involve selectively generating clock data edges based at least partially on transitions identified as mid-bits which correspond to transitions between received data bits. In certain embodiments, a given transition in a current multi-bit group of transition bits is identified as a mid-bit if no transitions occurred in the two previous multi-bit groups of transition bits. In certain embodiments, a given transition is identified as a mid-bit if a transition is indicated in a most significant bit (MSB) in a second previous multi-bit group of transition bits, and a transition is indicated in a least significant bit (LSB) in the current transition bit group.

Further aspects of the present disclosure relate to receivers for processing Manchester coded serial data streams. In certain embodiments, the receiver includes a sampling circuit that samples the data stream, as well as a transition circuit which generates multi-bit groups of transition bits, where the individual transition bit groups indicate data transition locations in a corresponding multi-bit group of sampled bits. The receiver further includes a clock data recovery circuit that generates clock data using only the multi-bit groups of transition bits. In certain embodiments, the clock data recovery circuit includes a logic circuit that detects at least one pattern in the transition bit groups and derives the clock data based on the pattern(s). In certain embodiments, moreover, the logic circuit selectively generates clock data edges based at least partially on transitions identified as mid-bits associated with transitions between received data bits.

Motor drives are provided, which include power conversion circuitry as well as a receiver for processing received Manchester coded data. The included receiver includes a sampling circuit as well as a transition circuit which generates multi-bit groups of transition bits indicating data transition locations in sampled data bit groups, along with a clock data recovery circuit that generates clock data based solely on the multi-bit groups of transition bits.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIGS. 7 and 8 are tables illustrating transition register bit patterns for various bit alignment situations corresponding to different encoded bit pairs.

DETAILED DESCRIPTION

Figure 1:
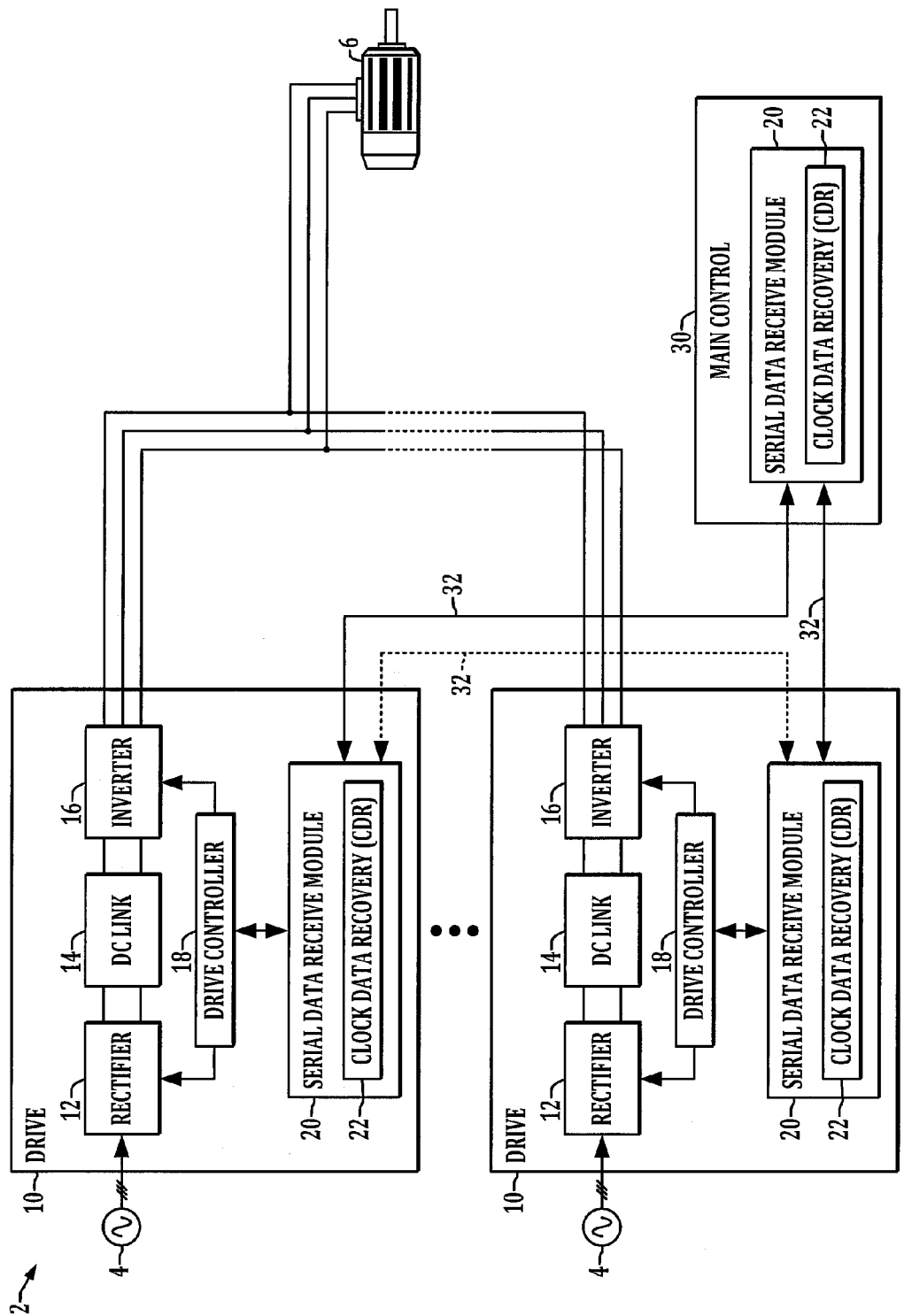
FIG. 1 is a schematic diagram illustrating a parallel motor drive system with two or more motor drives connected to drive a single motor load, as well as a main controller, where the controller and each of the drives includes a serial data receive module with a clock data recovery system for providing a clock based on a received serial Manchester coded data stream.

Referring now to the figures, several embodiments or implementations are hereinafter described in conjunction with the drawings, wherein like reference numerals are used to refer to like elements throughout, and wherein the various features are not necessarily drawn to scale. Methods and apparatus are disclosed for recovering clock data from a stream of Manchester coded serial data, wherein the following examples are illustrated and described in the context of a system of parallel-connected motor drives used to drive a single motor load. However, the disclosed techniques find utility in association with other systems in which Manchester coded serial data streams are received, wherein the present disclosure is not limited to the illustrated applications or systems.

Referring initially to FIG. 1, a system 2 is depicted for driving a motor load 6 using power provided by one or more power sources 4. The system 2 includes two or more motor drives 10 receiving power from the power source(s) 4, each drive 10 having an input connected to receive single or multiphase AC input power from the source(s) 4 and an output for providing output electrical power to drive the motor load 6, where the outputs of the motor drives 10 are connected in parallel in the system 2. Illustrative examples of parallel-connected motor drives with communication links using sync pulses for clock recovery or clock adjustment are described in Campbell et al., US published patent application number 2012/0013372, assigned to the assignee of the present disclosure, the entirety of which is hereby incorporated by reference.

The individual motor drives 10 in FIG. 1 include a passive or active rectifier 12 receiving the AC input power and providing DC output power to a DC link circuit 14, as well as an inverter 16 receiving input power from the DC link circuit 14 and providing AC output power to the motor load 6. A drive controller 18 is provided which generates control signals for the inverter 16 and also may provide switching control signals to the rectifier circuit 12. As shown, moreover, the motor drives 10 also include a serial data receive module 20 with a clock data recovery (CDR) circuit or module 22. In the illustrated configuration, the motor drives 10 exchange data with a main controller 30, and/or the drives 10 may exchange data with one another via serial data connections 32, which may be fiber-optic cables in certain embodiments. The main controller 30 (if used) also includes a serial data receive module 20 with a clock data recovery component 22. In particular, the drives 10 may receive data via the links 32 related to operation of the respective inverters 16, such as carrier waveform data by which the inverters 16 generate output power to drive the motor 6.

As discussed above, such parallel connection of motor drive outputs may result in circulating currents flowing between the motor drives 10, particularly where the output power waveforms are not closely synchronized. Accordingly, certain implementations of the motor drives 10 and/or the main controller 30 may advantageously attempt to synchronize operation of the inverters 16, and the serial data receive modules 20 are configured to derive or otherwise generate clock data based exclusively on received Manchester coded serial data. As a result, the serial data connections 32 need not provide separate data paths for transmission of clock pulses, and no internal clock adjustment apparatus is needed for each of the devices receiving Manchester coded serial data. Further, the system 2 does not require transmission of synchronization data or sync pulses as was done in the past, and hence data throughput can be maximized without interruption for such sync pulses.

Figure 2:
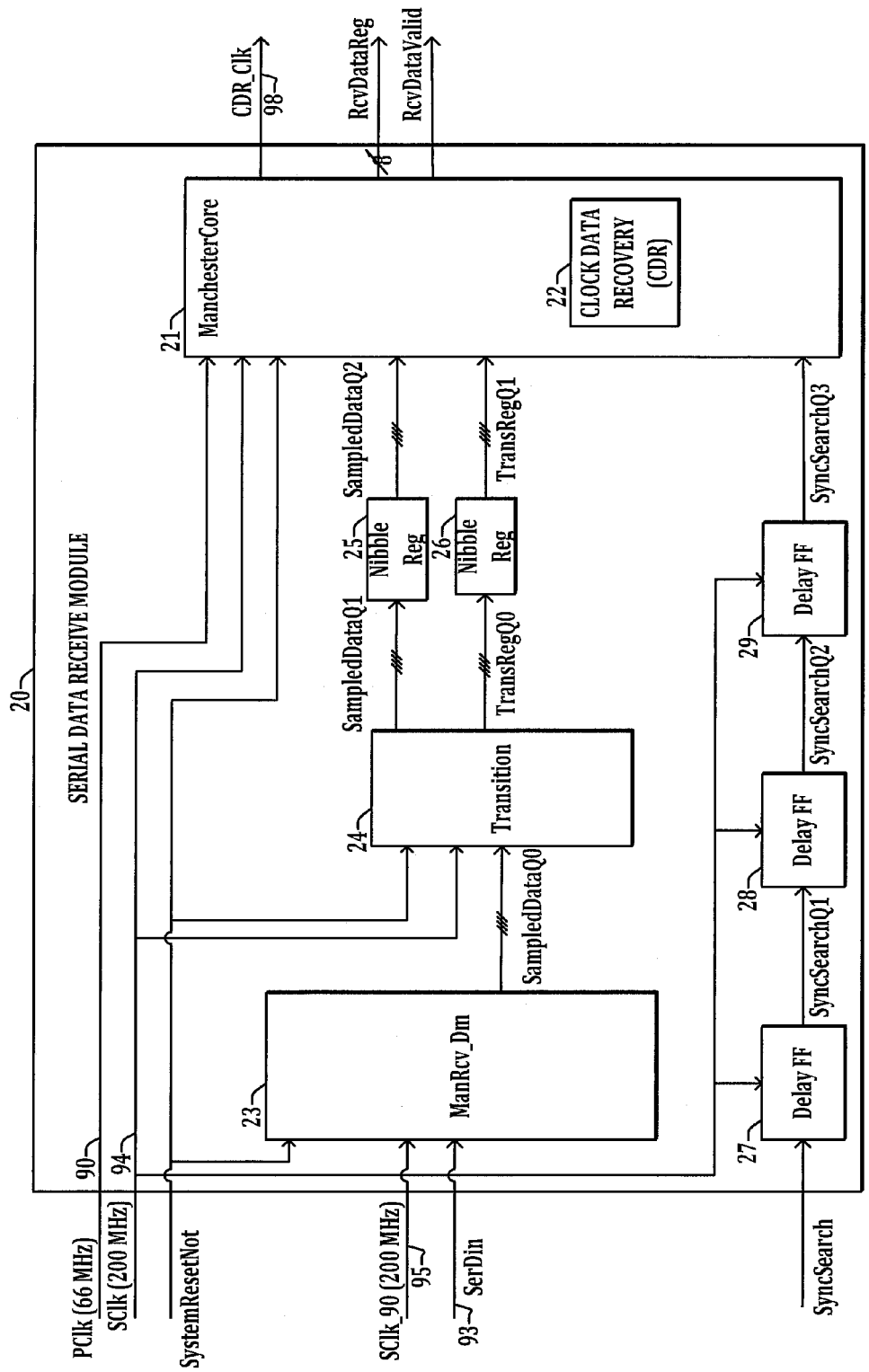
FIG. 2 is a schematic diagram illustrating further details of an exemplary serial data receive module including a clock data recovery system.
Figure 6:
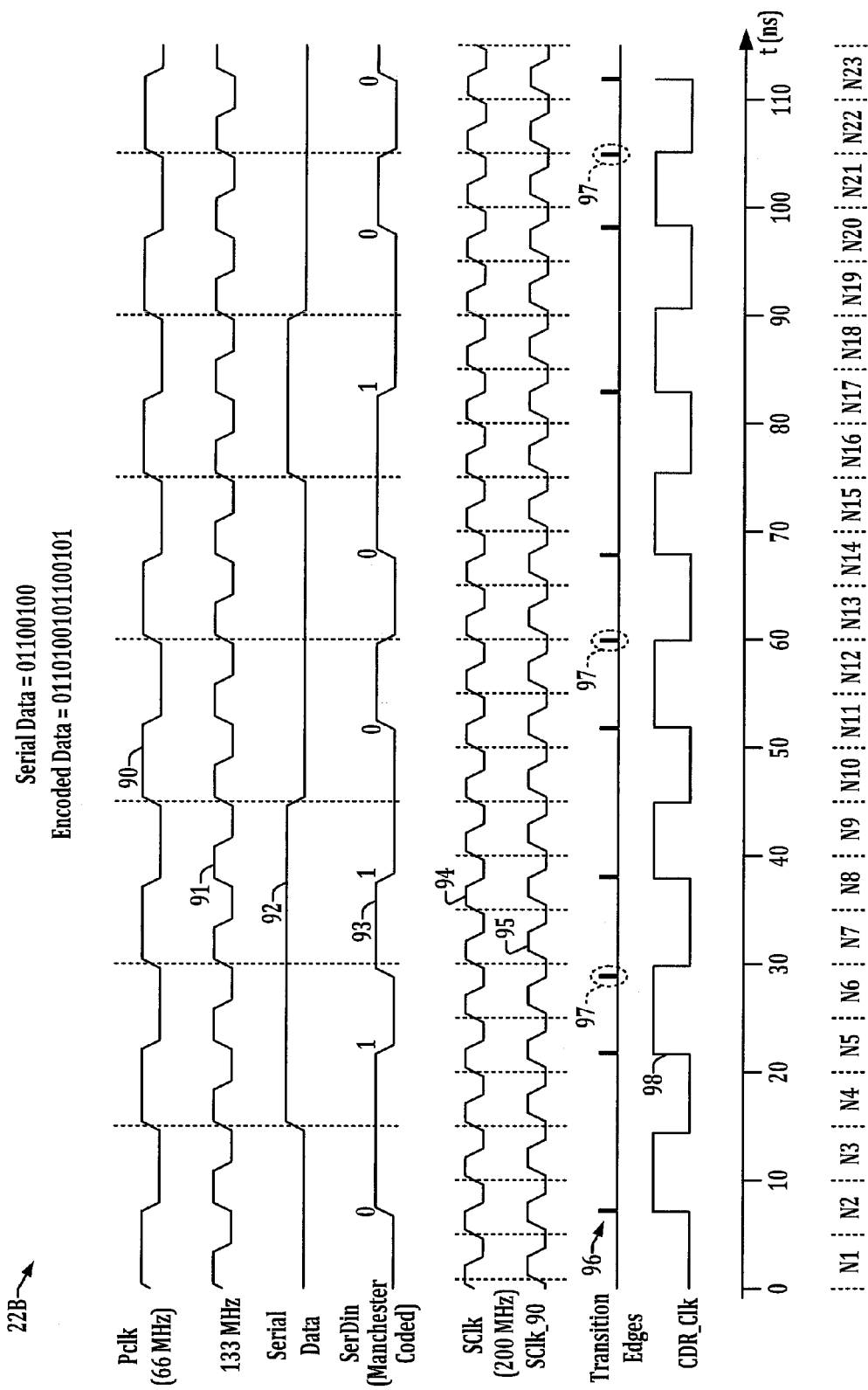
FIG. 6 is a waveform diagram illustrating various clock and data signals in the clock data recovery circuit.

FIG. 2 illustrates further details of an exemplary serial data receive module 20 which can be employed in the system 2 of FIG. 1. As seen in FIG. 2, the module 20 receives a 66 MHz clock 90 (identified as PClk) as well as a higher frequency (200 MHz) sample clock SClk 94 and a 90 degree phase shifted version thereof (SClk_90) 95, which clock signals can be provided from any suitable clock sources within the host motor drive 10 or the host controller 30 in certain embodiments. The module 20 also receives an active-low system reset signal (SystemResetNot), and a sync search input (SyncSearch). In addition, the serial data receive module 20 receives an input stream of Manchester coded data 93 (SerDin), where FIG. 6 illustrates an example Manchester coded serial data stream 93 along with corresponding serial data 92, a 66 MHz clock signal 90, 200 MHz clocks 94 and 95, and a 133 MHz clock signal 91. As seen in FIG. 6, the serial data input by the receive module 20 is Manchester coded, where a "0" data bit in the serial data 92 is represented in the Manchester coded data stream 93 as a 0-1 transition, and a binary "1" data bit in the serial data 92 is represented as a Manchester coded transition 1-0. FIG. 6 also illustrates a stream of transition edges 96 generated by the serial data receive module 20 and a resulting recovered clock signal CDR_Clk 98 including rising edges corresponding to some of the transition edges 96, referred to herein as "mid-bits", with the exception of certain non-mid-bit transitions 97 as discussed further below.

The present disclosure provides techniques and apparatus (including a clock data recovery component 22 in the serial data receive module 20) by which the recovered clock signal 98 is derived solely from transitions in the received Manchester coded serial data stream 93. As seen in FIG. 2, the serial data receive module 20 provides the recovered clock signal CDR_Clk 98 as an output for use by a host system in processing the received Manchester coded serial data stream 93, and also outputs received data in eight-bit bytes (RcvDataReg, providing decoded data as an 8 bit vector, synchronous to the 66 MHz clock PClk 90) along with an output data "valid" signal RcvDataValid (Data Valid Signal for the 8 bit decoded data, synchronous to PClk 90). The novel clock data recovery component 22, in this regard, facilitates low-overhead in the receiver module 20, without requiring adjustment of a local clock based on received sync pulses or other received synchronization information, and also does not require separate clock signals to be provided from a transmission source to the receiver module 20.

As further shown in FIG. 2, the serial data receive module 20 includes a Manchester core processing component 21 (ManchesterCore), which in this case includes the clock data recovery component 22. In addition, the receive module 20 includes a receive circuit 23 (ManRcv_Dm), a transition component or circuit 24, a pair of four-bit nibble registers 25 and 26, as well as a series of three delay flip-flop circuits 27, 28 and 29 used for synchronization by successively delaying the received SyncSearch input signal (indicating the beginning of a message) according to the 200 MHz clock 94. The SyncSearch circuitry 27-29 is used to detect a sequence of four consecutive "1"s (1111), and is delayed by four clocks so that the Manchester core 21 sees the sync signal SyncSearchQ3 at the appropriate time. Any suitable predefined bit sequence can be used to indicate a sync signal or pattern in other embodiments, wherein "1111" is just one possible non-limiting implementation. SyncSearchQ3 is then used as an enable signal by sink detection components 51-57 as described further below in connection with FIG. 4. The receiver 20 samples the incoming data stream to obtain for sampled data bits every 5 ns using a 200 MHz quadrature clock. The module 20, moreover, operates in multiple modes, including a "Sync Search" Mode and a "Normal Count" Mode, and is configured to operate in the Sync Search mode until a sync signal is decoded (e.g., "1111" in the illustrated embodiments). The module 20 outputs eight bits of data (RcvDataReg) with a data valid signal (RcvDataValid) synchronized with the 66 MHz clock, along with the recovered clock (CDR_Clk, e.g., approximately 66 MHz) obtained using the Manchester coded serial data stream SerDin without needing a separate input clock signal or received sync pulses.

The receive module 20 in certain embodiments may be implemented as several modules with specialized functions. The module 20 and the components thereof, including the Manchester core component 21 and the clock data recovery (CDR) module 22, may be implemented as any suitable hardware, processor-executed software, processor-executed firmware, programmable electronic device(s), etc., and may include any necessary or useful electronic memory. In certain embodiments, multiple modules or components operate to sample the Manchester coded serial data SerDin, recover the clock CDR_Clk from the received Manchester coded data stream, decode the serial data and generate 8-bit vectors RcvDataReg as output data along with a data valid signal RcvDataValid, and a reset for each module is made synchronous to the clock on which the module 20 runs in certain implementations, where a safe reset along with handshaking provides safe clock domain crossings. As seen in FIG. 2, the Manchester receive module 23 converts a serial bit stream SerDin to a 4-bit parallel register SampledDataQ0, and inputs 200 MHz clocks 94 and 95 for sampling the serial bit stream SerDin at the positive and negative edge of both the clocks to generate a 4-bit register SampledDataQ0, and outputs 4-bit data every 5 ns.

Figure 3:
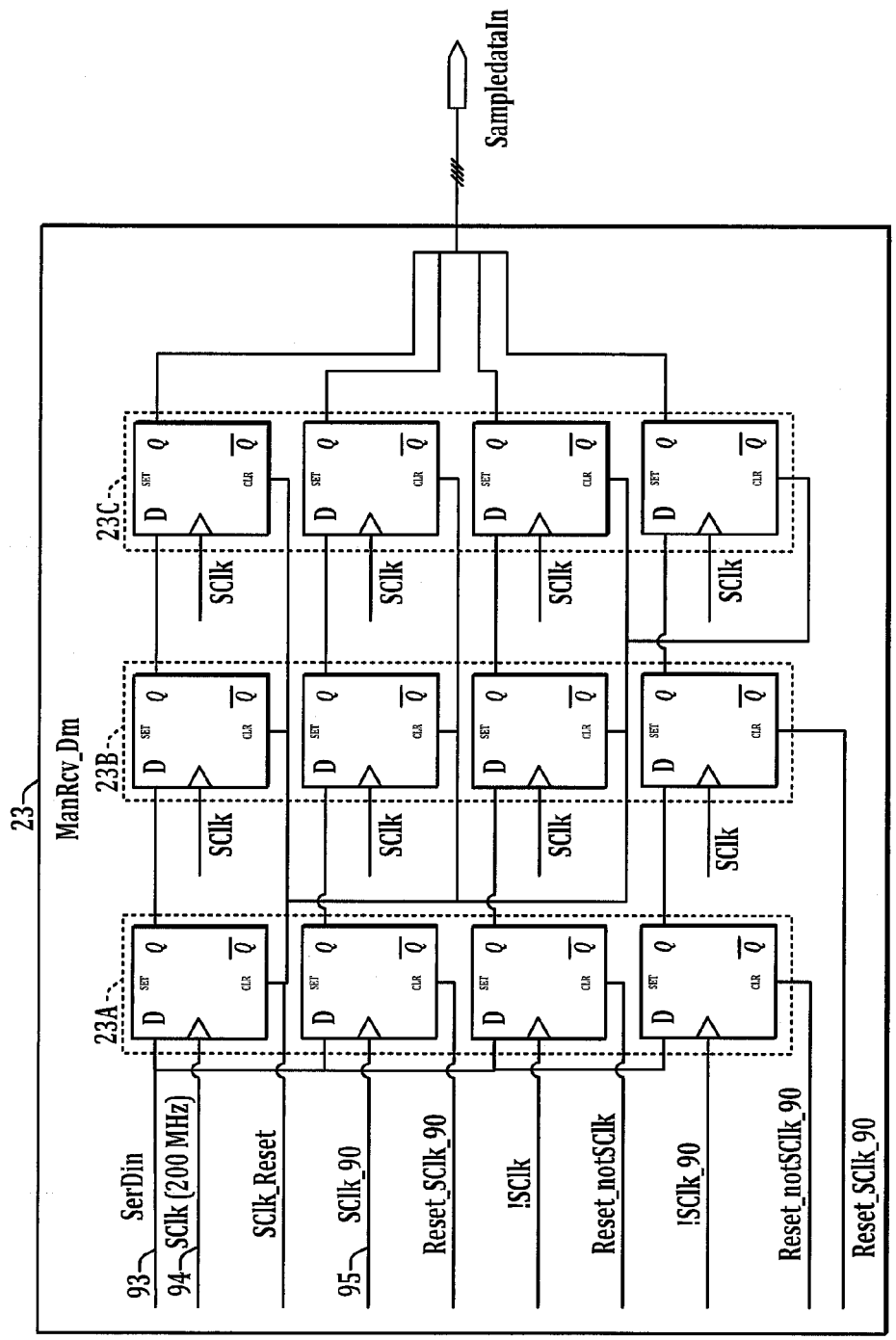
FIG. 3 is a schematic diagram illustrating further details of the Manchester receive data module in the serial data receive module of FIG. 2.

FIG. 3 illustrates further details of the receive circuit 23 (ManRcv_Dm), which includes three stages of four data (D) flip-flops 23A, 23B and 23C. The first stage of four flip-flops 23A operates on the received Manchester coded serial data stream 93 connected to the individual "D" inputs, and the four flip-flops in the first stage 23A each operate according to a corresponding 200 MHz clock input, where the first (upper) flip-flop uses the 200 MHz clock 94 (SClk), the next flip-flop uses the 90° phase shifted clock 95 (SClk_90), the third flip-flop uses the inverse of the clock 94 (!SClk), and the final (bottom) flip-flop operates from the inverse of the 90° phase shifted clock 95 (!SClk_90). The Manchester receiver circuit 23 may internally generate these four clocks successively phase shifted by approximately 90°, or such may be provided as inputs to the circuit 23, or combinations thereof. In addition, the clear (CLR) inputs of the flip-flops in the first stage 23A are connected to corresponding reset signals SClk_Reset, Reset_SClk_90, Reset_notSclk and Reset_notSclk_90, respectively. The first stage 23A thus quadrature samples the incoming data stream SerDin 93 using a 200 MHz sample rate via the phase shifted clock inputs (e.g., quadrate clock) to obtain a 4-bit digital data nibble every 200 MHz (every 5 ns). In the illustrated example, as seen in FIG. 6 below, the input data stream 93 is Manchester coded to represent the serial data 92 having an input baud rate of 66 MHz, whereby the quadrature sampling in the circuit 23 is at a higher sample rate than the incoming data baud rate. The succeeding second and third stages 23B and 23C in FIG. 3 each include four D flip-flops, each having a data (D) input receiving the data (Q) output of the corresponding flip-flop of the preceding stage, where the clock inputs are connected to the 200 MHz clock 94 (SClk) and the clear (CLR) inputs in the stages 23B and 23C are connected to the serial clock reset signal SClk_Reset. The resets for the flip-flops are synchronous to the incoming clock to provide a safe reset. The Manchester receive circuit 23 thus samples the Manchester coded serial data stream SerDin at a quadrature 200 MHz rate which is higher than the input baud rate (66 MHz) to obtain multi-bit groups of sampled bits (SampledDataQ0). In the illustrated embodiment, a 4-bit nibble is obtained every 5 ns, although other embodiments are possible using other sample rates, and any number of bits may be provided in an output sampled data bit group in accordance with various aspects of the present disclosure.

Referring again to FIG. 2, the Transition component 24 receives the 4-bit sampled data (nibble) SampledDataQ0 as an input from the receive component 23, and outputs a transition register (TransRegQ0) including a multi-bit group of transition bits (e.g., 4 bits in the illustrated example) in which a binary "1" indicates the location of a transition or "edge" in the output (delayed) sampled data bit group SampledDataQ1. In particular, a binary "1" in the transition register TransReg in certain embodiments indicates the transition of data from (to) a "1" to (from) "0" in the Manchester coded data stream. For instance, an input nibble "1110" (SampledDataQ1) received by the transition component 24 results in a transition register output "0010" (TransRegQ0). Other illustrative examples include a sampled data nibble "0111" yielding a transition register nibble "1000"; a sampled data nibble "0011" yielding a transition register nibble "0100" and a sampled Manchester coded data nibble "1111" resulting in a transition register nibble "0000". The transition module 24 further outputs the corresponding sampled data SampledDataQ1 delayed by one clock cycle of the 200 MHz clock SClk, where the output of the module 24 includes the transition bit nibble TransRegQ0 as well as the corresponding sampled data bit nibble SampledDataQ1. As seen in FIG. 2, these output nibbles are provided to a pair of corresponding 4-bit nibble registers 25 and 26, which in turn output sampled data nibble SampledDataQ2 and transition nibble TransRegQ1, respectively, which are provided as inputs to the Manchester core component 21. It will be noted in the drawings that the relative clock delays between various data groups may be denoted using "Q0", "Q1", "Q2", etc., where the number following the "Q" indicates the number of clock cycle delays relative to a current or most recent data group.

Figure 4:
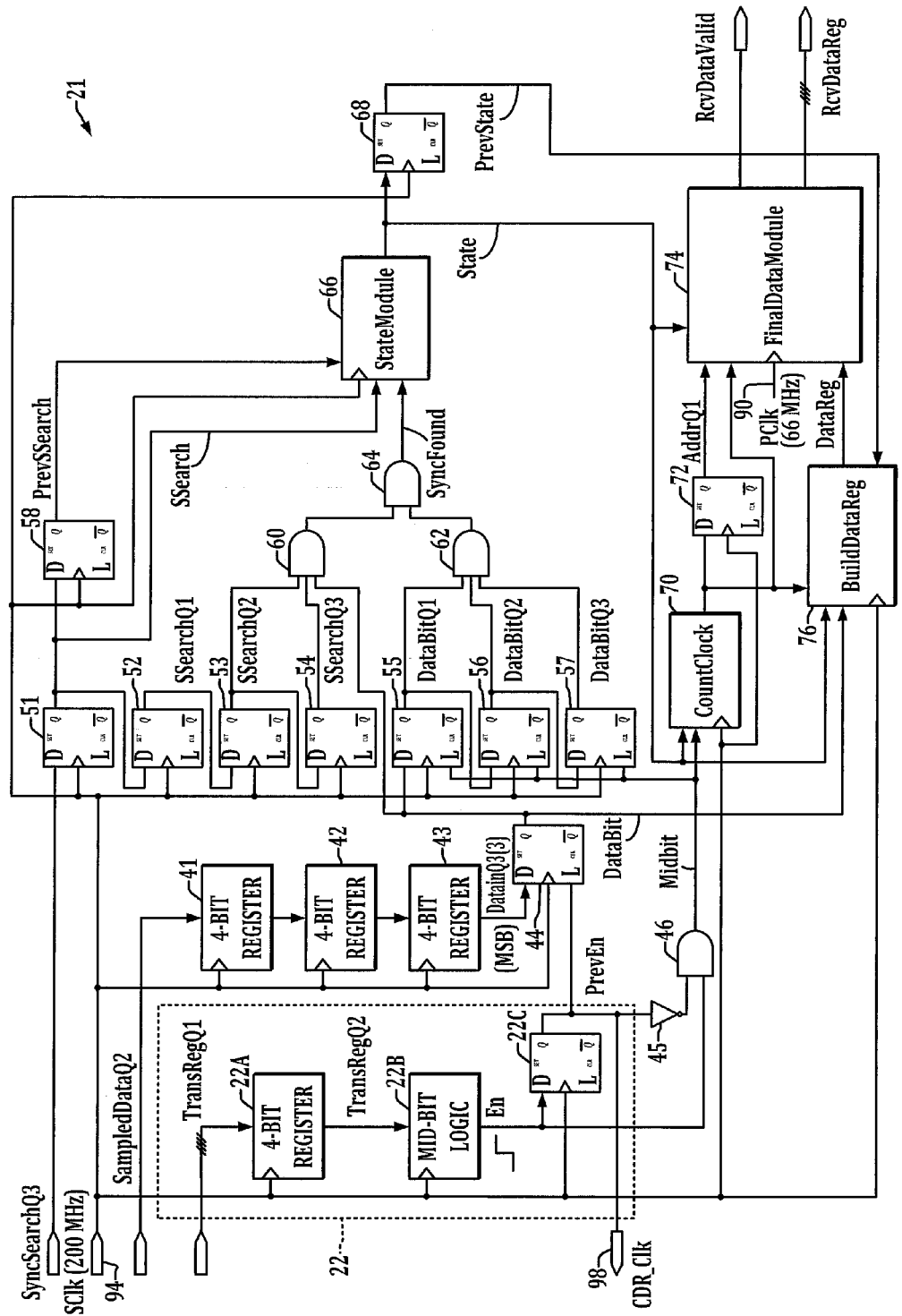
FIG. 4 is a schematic diagram illustrating further details of a Manchester core circuit with a clock data recovery system in the serial data receive module of FIG. 2.
Figure 5:
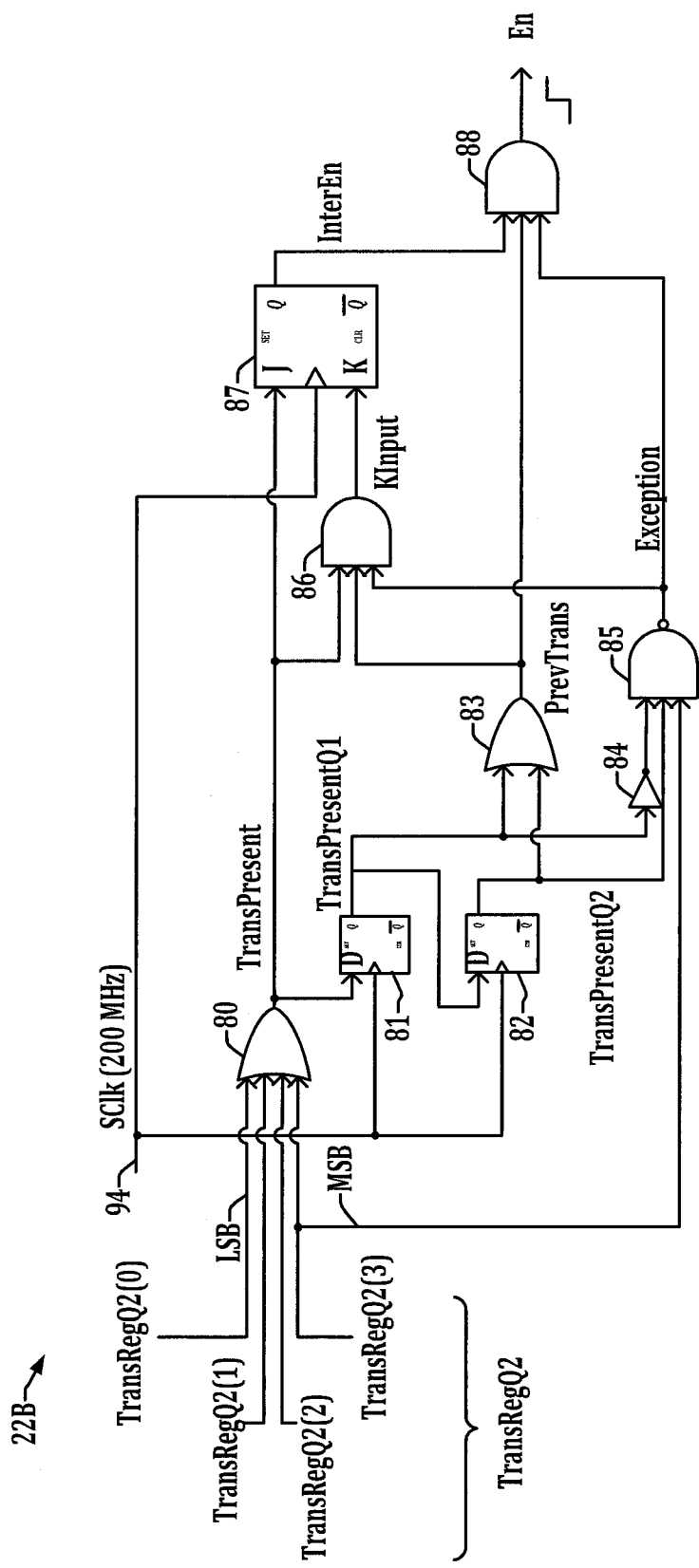
FIG. 5 is a schematic diagram illustrating further details of a clock data recovery circuit in the Manchester core of FIG. 4.

Referring also to FIGS. 4 and 5, the ManchesterCore block 21 receives one nibble of samples (4-bits, SampledDataQ2) as well as one nibble of transitions or edges (4-bits, TransRegQ1). FIG. 4 illustrates further details of an exemplary Manchester core circuit or component 21, which receives the sampled data nibble SampledDataQ2 and transition nibble TransRegQ1 from the transition component 24 (FIG. 2). As seen in FIG. 4, the Manchester core also receives the output of the third sync search delay flip-flop 29 (SyncSearchQ3), as well as the 200 MHz sample clock SClk 94. The Manchester core 21, moreover provides a clock data recovery clock signal 98 (CDR_Clk) from a clock data recovery (CDR) circuit 22, and also provides the 8-bit received data register output RcvDataReg and a corresponding receive data valid signal RcvDataValid synchronized to the 66 MHz clock PClk 90 (FIG. 2). Use of the clock data recovery circuit or system 22 allows the receiver 20 to independently generate (recover) the clock CDR_Clk directly from Manchester coded serial data stream SerDin (e.g., 4 bits every 5 ns using a 200 MHz sample clock with quadrature sampling, equivalent to 800 MHz sampling), which represents a significant improvement over prior techniques in which each receiver had a predefined clock that required adjustment.

As shown in FIG. 4, the data recovery circuit 22 of the Manchester core 21 includes a first 4-bit register 22A that receives the group of transition bits TransRegQ1 and provides a delayed set of transition bits TransRegQ2 to mid-bit logic circuit 22B. The mid-bit logic 22B provides a clock enable output En for which a rising edge indicates identification of a "mid-bit" in the 4-bit group of transition bits TransRegQ2 currently being analyzed. The clock recovery circuit 22 further includes a D flip-flop 22C providing an output PrevEn delayed one cycle of the 200 MHz clock 94 from the enable output En of the mid-bit logic 22B, and the PrevEn clock data is output by the clock data recovery circuit 22 as the recovered clock CDR_Clk. The recovered clock CDR_Clk thus constitutes clock data recovered solely from the multi-bit group of transition bits TransRegQ2, and is provided as an output of the serial data receive module 20 for use by host system (motor drive 10, controller 30, etc.) in processing the received data along with the 8-bit decoded data byte RcvDataReg and the corresponding receive data valid signal RcvDataValid (FIG. 2). In this embodiment, moreover, the recovered clock data CDR_Clk 98 (e.g., FIG. 6) has positive (rising) edges indicating the presence of mid-bits in the transition data (TransRegQ2), although other implementations are possible in which a falling edge corresponds to identified mid-bits, or other clock data may be provided based on the transition bit groups in different embodiments.

The Manchester core 21 also receives the sampled data nibble SampledDataQ2 from the nibble register 25 (FIG. 2) and uses a series of 4-bit registers 41, 42 and 43 to successively delay the sampled data by four clock cycles (200 MHz clock 94) to provide an input MSB of DatainQ3 (DatainQ3(3)) to the data input of a flip-flop 44 which uses the PrevEn as a load input. The flip-flop 44 provides a DataBit output as an input to an AND gate 60 as well as a data build register 76 (BuildDataReg). The Manchester core 21 further provides synchronization search circuitry including flip-flops 51, 52, 53 and 54, providing search outputs SSearch, SSearch Q1, SSearchQ2 and SSearchQ3, respectively. These outputs are provided as inputs to a state module 66 via AND Gates 60 and 64, along with the received sampled data including signals DataBit, DataBitQ1, DataBitQ2 and DataBitQ3 from the D flip-flop 44 as well as data bit flip-flops 55, 56 and 57 using AND gate 62 and gate 64, thereby providing a SyncFound input to the state module 66. In addition, the state module 66 receives a previous sync search input PrevSSearch from a D flip-flop 58 whose input is the SSearch signal from the flip-flop 51. The state module 66 outputs a signal "State" which is provided as an input to a D flip-flop 68 whose output is a PrevState signal used as an input by the build data register 76. The State output from the state module 66 is also provided as an input to a count clock circuit 70, the build data register 76, and to a final data module (FinalDataModule) 74 as seen in FIG. 4.

The clock counter circuit 70 receives a Midbit output signal from an AND gate 46 whose inputs are the En signal from the mid-bit logic 22B and the inverse of the PrevEn signal from the flip-flop 22C via inverter 45, and the CountClock circuit 70 also receives the State input from the state module 66 and the 200 MHz sample clock 94, and provides an output to the input of a D flip-flop 72. The BuildDataReg circuit 76 receives the State input from the state module 66 along with the DataBit output from the flip-flop 44, the output of the count clock circuit 70, and the PrevState signal from the flip-flop 68, and provides a data register output DataReg as an input to the final data module 74. The final data module 74 receives the State input from the state module 66, the output of the count clock circuit 70, and the DataReg output from the build data register 76, and provides the byte of received output data bits RcvDataReg and the data valid signal RcvDataValid synchronized with the 66 MHz clock 90 (PClk).

FIGS. 5-9B show further details and operation of the Midbit Logic 22B, which generates the En signal (FIG. 5) based solely on the group of transition bits TransRegQ2. In the illustrated 4-bit implementation, TransRegQ2 includes transition bits TransRegQ2(0) (e.g., LSB), TransRegQ2(1), TransRegQ2(2), and an MSB TransRegQ2(3). In one possible implementation, the Midbit logic 22B can be implemented using circuit components as shown in FIG. 5, including an OR gate 80, a pair of D flip-flops 81 and 82, a 2-input OR gate 83, an inverter 84, a NAND gate 85, an AND gate 86, a J-K flip-flop 87, and a final AND gate 88. The 66 MHz clock 90 (FIG. 6) sets the serial baud rate at which data (quadrature) is received, and the original data 92 is Manchester coded (e.g., example SerDin 93 in FIG. 6). As illustrated, if the original data is 0 for a single 66 MHz clock, the encoded data will be a transition (during that single clock cycle) from 0-1 (Manchester coded), and the converse is true for an original encoded "1".

The Manchester coded data stream is quadrature sampled as discussed above using a 200 MHz quadrature clock to implement an 800 MHz effective sample rate. This yields a nibble (4 bits) every 5 ns, and therefore 12 samples every 15 ns (of the 66 MHz clock 90). Consequently, the system ideally presents 12 bits of new sampled data every 15 ns (every 12 samples). It is noted, however, that the Manchester coded serial data stream ideally changes (transitions) approximately halfway in between the original data bits, and thus a change in data is expected every six sampled bits. As a result, the transitions in the Manchester coded serial data stream 93 that occur at this rate represent "mid-bits" which are used by the logic 22B to generate recovered clock data (rising transitions in the En output from the AND gate 88). In this regard, the timing diagram of FIG. 6 illustrates exemplary nibble positions N1-N23 corresponding to the quadrature sampled data nibbles and corresponding transition registered nibbles, and further illustrates transition edges 96 seen in the transition register bit groups, including mid-bits (used by the logic 22B for clock derivation), as well as transition edges 97 related to the Manchester coding scheme in which two consecutive serial data bits 92 having the same binary value require an extra transition for the Manchester coding, where the logic 22B selectively avoids generating clock data based on the non-mid-bit transition edges 97.

FIGS. 7 and 8 depict tables 100 and 102, respectively, illustrating transition register bit patterns for various bit alignment situations corresponding to different encoded bit pairs. In the table 100 of FIG. 7, for instance, examples are shown for groups of transition bits resulting from Manchester coding of binary data "00" or binary "11", in which the transition edges (e.g., transition edges 96 in FIG. 6) are "5 bits away", "6 bits away", and "7 bits away", where the "6 bits away" condition is ideal in this sampling embodiment. Similarly, the table 102 in FIG. 8 illustrates transition bit group pattern examples for encoded binary "01" or "10" in the cases where the transitions (edges) are spaced from one another by 11, 12, and 13 bits, respectively, in which the "12 bits away" case represents the ideal situation, and the "11 bits away" and "13 bits away" cases represent departure from the ideal. The nibbles occur from right to left in the tables 100 and 102, as indicated by arrows 101 and 104 in FIGS. 7 and 8, respectively. In the bit sequence indicated at 103 in FIG. 8, for example, the nibble "0001" occurs at time t=0; "0000" occurs at time t=5 ns; "1000" occurs at time t=10 ns, etc. The inventors have appreciated, moreover, that such deviations can occur over time due to imperfections in the source of the received bits (e.g., the transmitter side) or deviations in frequency and/or phase between the transmitter and receiver clock source(s).

The midbit logic 22B addresses this problem without requiring clock adjustment or separate transmission of transmitter clock pulses, and instead utilizes the received data and the transition bit groups derived therefrom to recover or derive the clock data CDR_Clk. In particular, the logic 22B tracks whether or not a "1" is present in a particular group of transition bits (indicating a transition), and if so, where it occurred. In this regard, the 4-bit transition register nibble TransReg is constructed by the transition component 24 (FIG. 2) such that the individual transition bits indicate data transition locations in the corresponding sampled data bit group. The mid-bit logic 22B (FIG. 5) implements rules for detection of data transition edges between separate data bits, referred to herein as mid-bits, as well as for discriminating those transitions merely associated with the nature of Manchester coding. Accordingly, accurate identification of the mid-bits in the transition register groups facilitates generation of the derived clock data.

In the illustrated case, a rising edge on the CDR_Clk data 98 can be used as a clock edge, although other implementations are possible. It is noted in this regard, that the illustrated logic 22B provides output clock data (e.g., CDR_Clk signal or data 98 in FIG. 6 based on the En signal output by the mid-bit logic 22B) in which the pulse widths may vary somewhat, since the logic 22B involves evaluation of transition bit groups (e.g., 4-bit groups in the illustrated implementation). However, the resulting recovered clock data CDR_Clk 98 is nonetheless accurate enough to facilitate the processing of the received Manchester coded serial data stream and the provision of the output byte RcvDataReg, along with the data valid signal RcvDataValid to allow a host system (e.g., motor drive 10 and/or controller 30 in FIG. 1 above) to synchronize multiple parallel-connected motor drive outputs or to perform other synchronized or cooperative operation of multiple devices or systems.

In the illustrated implementation, the logic circuit 22B operates to derive clock data (En output used to generate the CDRClk clock 98) based solely on the multi-bit groups of transition bits TransReg. The mid-bit logic 22B detects one or more patterns in the transition bits TransReg, and derives the clock data CDRClk 98 based on the detected pattern(s). To do this, the illustrated embodiment selectively generates clock data edges En in the clock data based at least partially on transitions 96 identified as mid-bits associated with transitions between received data bits, for example, according to one or more rules. In certain embodiments, one possible rule includes identifying a given transition in a current transition nibble TransReg as a mid-bit if the given transition is a first received transition. Separately or in combination, the logic 22B can identify a given transition in a current transition nibble TransReg as a mid-bit if no transitions occurred in the two previous transition nibbles. In certain embodiments, moreover, the logic 22B selectively identifies a given transition as a mid-bit if a transition is indicated in a most significant bit MSB in a second previous transition nibble TransReg and a transition is indicated in a least significant bit LSB in the current transition nibble TransReg. Other rules and/or combinations of roles may be implemented in various embodiments by which clock data edges En are generated in the clock data at least partially according to transitions 96 identified as mid-bits associated with transitions between received data bits, preferably excluding transitions (e.g., transitions 97 in the example of FIG. 6) which are merely the result of the nature of the Manchester encoding. Moreover, while the illustrated logic 22B and the corresponding mid-bit identification rules are applicable to the above-described situation in which 12 sampled bits are received or otherwise obtained every 5 ns, different levels of oversampling can be accommodated by corresponding mid-bit identification rules and logic, wherein all such alternate implementations are contemplated as falling within the scope of the present disclosure.

The inventors have appreciated that detected mid-bits show a pattern or patterns that can be used to reconstruct or recover a clock purely based on the received Manchester coded serial data stream. In the illustrated implementation, the first transition that occurs is identified as a mid-bit. If another transition occurs in the next two transition nibbles, it is not a mid-bit, but the following transition that occurs is identified as a mid-bit. Also, if a transition is observed and no transitions occurred in the previous two transition nibbles, the transition is identified as a mid-bit. There is an exception case for the following transition bit pattern: "1000 0000 0001", which is indicated at 103 in the table 102 of FIG. 8, where mid-bits occur in alternate nibbles. In the illustrated oversampling situation, this is the only case where actual mid-bits can occur in alternate nibbles. The mid-bit logic 23B of FIG. 5 implements these rules.

As seen in FIG. 5, the mid-bit logic 22B receives the transition register nibble TransRegQ2, and the OR gate 80 determines if the nibble has a "1" or not (whether it had a transition or not). This operation repeats every 5 ns in the illustrated embodiments. If a transition is detected in TransRegQ2, the gate 80 outputs the TransPresent as a logic 1, which will set the J-K flip-flop 87, causing the flip-flop output InterEn to go high, which is an input to the final AND gate 88. The TransPresentQ1 output of the first flip-flop 81 is delayed by one clock, and the output of the second D flip-flop 82 (TransPresentQ2) is delayed by two clocks. The NAND gate 85 provides an Exception output to cover an exception case (indicated at 103 in the table 102 of FIG. 8) in which a most significant bit MSB in a second previous transition nibble TransReg and a transition is indicated in a least significant bit LSB in the current transition nibble TransRegQ2. The exemplary patterns in FIGS. 7 and 8 show that the first edge received is identified as a mid-bit. The mid-bit logic 22B tracks the first transition (edge) that it receives, and discounts any transition occurring in the next 2 nibbles as not being a mid-bit. Thereafter, the next transition is identified as a mid-bit. The output is a rising edge of En that indicates the occurrence of a mid-bit. As seen, therefore, the clock recovery is based purely on the data, and specifically, where the transitions occur in the sampled data. As seen in FIG. 2, moreover, the En output of the mid-bit logic 22B is then delayed by one clock cycle via the D flip-flop 22C, which provides a previous enable output PrevEn. PrevEn is then provided as the recovered clock signal 98 (CDR_Clk).

It is noted that if the clocks on both transmitter and receiver sides were perfect and synchronized, the transition between adjacent bits in the received data nibble would occur at the same place every time. However, with imperfect crystals or oscillators at the receiver or transmitter, the relative transition locations may shift over time. The mid-bit logic 22B self adapts the recovered clock En, CDRClk to correspond with the transition locations in the received and sampled data. The logic 22B takes the data, determines where the transition is, and tracks where the transition is by looking at the transition nibble patterns, and selects the edge that is a mid-bit for use in generating the rising edge of the recovered clock CDRClk 98. In the illustrated embodiment, for instance, as the transition nibbles TransReg are received with data that moves to one side or the other, eventually an exception will be detected by the logic 22B. TransPresent indicates the presence of a transition in the current transition register nibble, and the subsequent D flip-flops 81 and 80 provide delayed outputs TransPresentQ1 and TransPresentQ2, respectively. The OR gate 83 provides a "1" output (PrevTrans) if a transition was present in either or both of the two preceding nibbles (if either TransPresentQ1 and/or TransPresentQ2 are "1"). If so, PrevTrans is "1", and if the TransPresent is also "1", the AND gate 86 provides a "1" input to the Kinput of the flip-flop 87, which toggles the flip-flop 87. The JK flip-flop 87 has the J input set every time a transition is seen, and the KInput signal at the flip-flop K input determines whether the output toggles or remains set. If the previous two nibbles had a transition, K is set, toggling the output. If an exception occurs, K is reset, giving a positive edge at the output. As a result, the OR gate 83 and the D flip-flops 81 and 82 keep track of the previous two nibbles, and if every alternate transition occurs within two nibbles, it is eliminated as a candidate for identification as a mid-bit (other than the Exception explained below).

In certain cases, every alternate transition is a mid bit, where the "Exception" output of the NAND gate 85 indicates the circled "11 bits away" case (103 in FIG. 8), in which a transition occurs in the first bit of one nibble, and in the last bit two nibbles later. For this exception, the NAND gate 85 and the inverter 84 provide an "Exception" input to the final AND gate 88 and to the KInput AND gate 86, where the NAND gate 85 allows the identification of a transition that is 11 bits away from the prior transition as a mid-bit for this exception situation. The gate 85 receives the MSB of the current nibble as an input, as well as inputs indicating lack of a transition in the previous nibble and a transition the nibble two clocks previously. In this situation, the Exception signal (="0") will prevent a reset of the J-K flip-flop 87 (KInput is zero) while the TransPresent output from the OR gate 80 is high, thereby setting the flip-flop 87, and the Exception signal going to "0" will also cause a positive edge at the En output via the final AND gate 88, since this exception condition is a true mid-bit. The JK flip-flop 87 ensures the generation of a rising edge at the output of the AND gate 88 to indicate a mid-bit. The final AND gate 88 makes sure that the final clock output En falls later (falling edge). As noted above, moreover, the pulse width of the recovered clock signal En and the resulting CDRClk 98 may vary slightly, but is nevertheless adequate for a host system to process the received data.

Referring back to FIG. 4, the detected mid-bit edge En is provided to the flip-flop 22C to avoid or mitigate jitter error, and is synchronized with the 200 MHz clock 94. This signal (PrevEn) is used to latch the data nibble that arrived one clock earlier than the nibble with the detected transition. The MSB of this nibble will correspond to the serial data sample that was Manchester encoded, and the serial bit is thus available after three clock cycles.

The State Module 66 in FIG. 4 decides the state of the receiver 20. At startup the receiver system 20 is assumed to be in the 'Sync Search' mode. The system 20 enters the Sync Search mode at a positive edge of the Sync Search input signal (SyncSearch in FIG. 2 above). When a sync signal ("1111") is decoded in a Sync Search mode, the system enters a "Normal Count" mode irrespective of the SyncSearch signal status. The CountClock circuit 70 counts the number of mid-bits when the system 20 is in the Normal Count mode (counts 0 through 7). The circuit 70 may be implemented as a decrementing counter functional only in the normal count mode of the system 20, where the output is decremented on every mid-bit identification. This forms the address used to build the 8-bit data register. Each data bit decoded is used to build an 8-bit register by the BuildDataReg module 76. This module 76 in certain embodiments starts forming the data register once the system 20 switches to the Normal Count mode. The initial (first) 8-bit register is "1111 xxxx". When the system initially enters the Normal Count mode, the output register bits 7:4 are set to "1111". The bits that are then decoded are inserted, beginning from bit position 3. This bit address is provided by the CountClock module 70. Consequently, the Manchester core 21 provides an 8-bit data register formed of the decoded data bits. After eight mid-bit transitions, an 8-bit data register is obtained, and the FinalDataModule circuit 74 keeps the Address output generated by the CountClock Logic 70. Each time eight mid-bits arrive, the data valid signal RcvDataValid is output by the circuit 74 along with the data register RcvDataReg built by the BuildDataReg module 76. The FinalDataModule 74 is synchronized with the 66 MHz clock, and outputs the data register along with a data valid signal once the 8-bit register is formed.

Figure 9A:
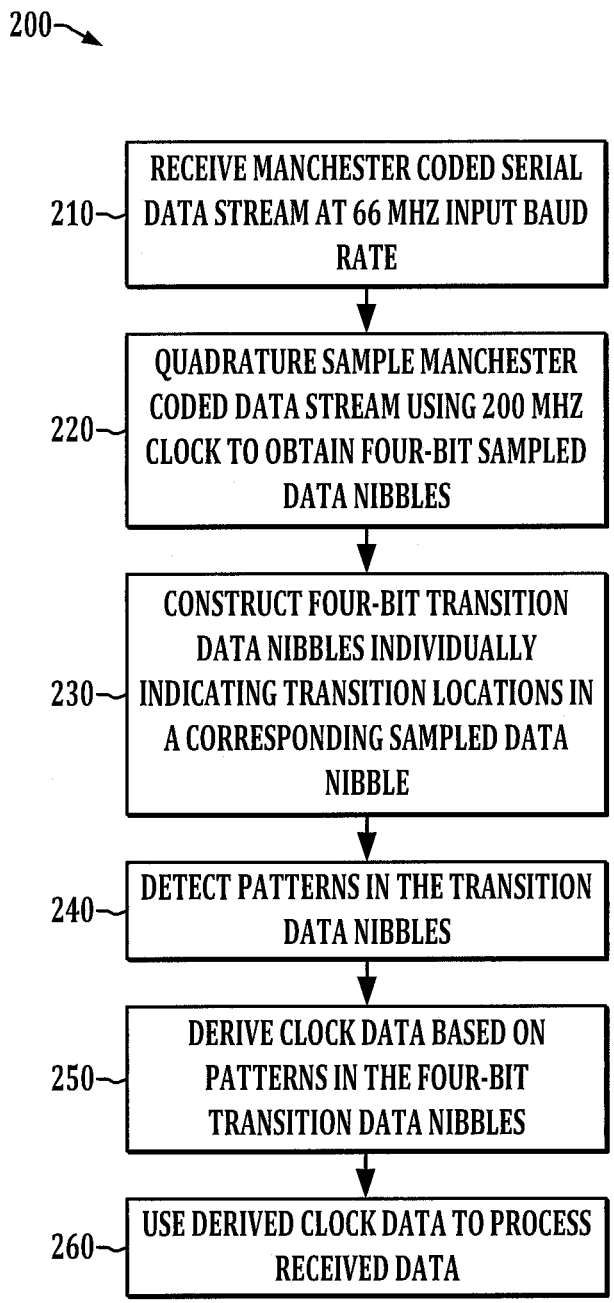
FIGS. 9A and 9B are flow diagrams illustrating a method for recovering clock data from a Manchester coded serial data stream.
Figure 9B:
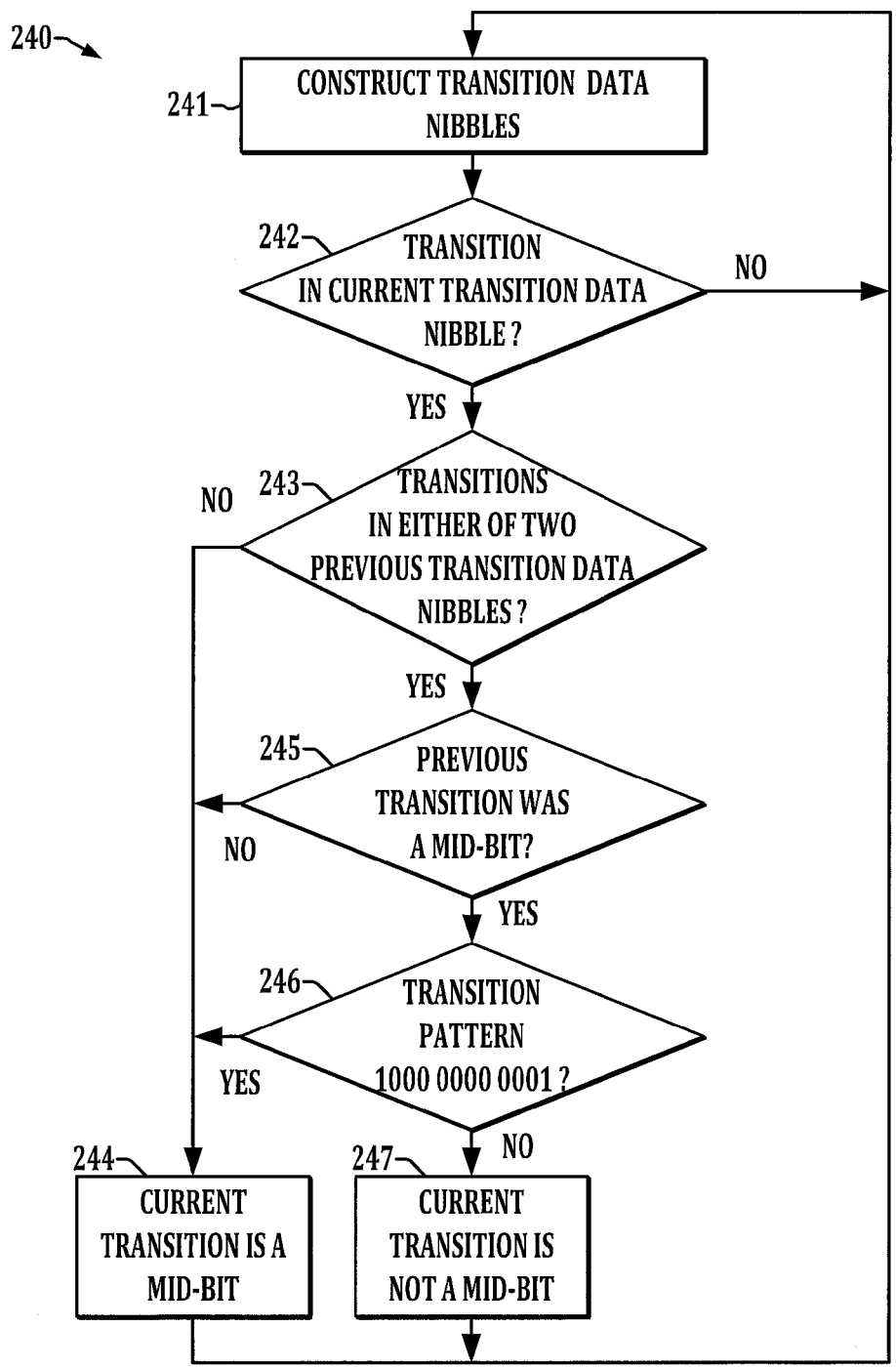

Referring now to FIGS. 9A and 9B, a process 200 is illustrated for deriving clock data from a Manchester coded serial data stream. Although the exemplary method 200 is depicted and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide clock data recovery from a Manchester coded serial data stream, for example, in a serial data receive module 20 such as that described above for use in a motor drive 10 and/or associated controller 30, although the present disclosure is not limited to the specifically illustrated or described applications and systems.

At 210 in FIG. 9A, a Manchester coded serial data stream is received at an input baud rate, for instance, 66 MHz in the above-described example. At 220, the data stream is quadrature sampled, for example using a 200 MHz sample clock rate, in order to obtain multi-bit sampled data groups (e.g., 4-bit data nibbles in one possible implementation). At 230, multi-bit transition data groups (e.g., 4-bit transition nibbles) are constructed, where the individual transition data bit groups indicate transition locations in a corresponding sampled data bit group. At 240, one or more patterns are detected in the transition data groups. At 250, clock data is derived exclusively according to the transition data group pattern(s), and the derived clock data may then be used at 260 to process the received data.

FIG. 9B illustrates one detailed implementation of the pattern detection at 240, in which transition data nibbles are constructed at 241, and a determination is made at 242 as to whether a transition occurred in the current transition data nibble. If not, the process 240 returns to construct the next transition data nibble at 241. If a transition is identified in the current transition data nibble (YES at 242), a determination is made at 243 as to whether there was a transition in either of two previous transition data nibbles. If not (NO at 243), the current transition is identified as a mid-bit at 244, and the process 240 returns to construct the next transition data nibble at 241. Otherwise (YES at 243), a determination is made at 245 as to whether the previous transition was a mid-bit. If not (NO at 245), the transition is identified as a mid-bit at 244. If the previous transition was a mid-bit (YES at 245), a determination is made at 246 as to whether the exception transition pattern is present (e.g., 1000 0000 0001 in the above described embodiments). If so (YES at 246), the current transition is identified as a mid-bit at 244, and otherwise (NO at 246), the current transition is not identified as a mid-bit at 247, after which the process 240 continues to the next transition data nibble at 241.

In accordance with further aspects of the present disclosure, a non-transitory computer readable medium is provided, such as a computer memory, a memory within a power converter control system (e.g., controller 100), a CD-ROM, floppy disk, flash drive, database, server, computer, etc.), which includes computer executable instructions for performing the above-described methods. The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for deriving clock data from a Manchester coded serial data stream, the method comprising:
   receiving the Manchester coded serial data stream corresponding to an input baud rate;
   sampling the Manchester coded serial data stream at a sample rate higher than the input baud rate to obtain multi-bit groups of sampled bits;
   constructing multi-bit groups of transition bits, the multi-bit groups of transition bits individually indicating data transition locations in a corresponding multi-bit group of sampled bits; and
   deriving the clock data based solely on the multi-bit groups of transition bits by selectively generating clock data edges in the clock data based at least partially on transitions identified as mid-bits associated with transitions between received data bits.

2. The method of claim 1, wherein sampling the Manchester coded serial data stream comprises quadrature sampling the Manchester coded serial data stream to obtain 4-bit groups of sampled bits, and wherein constructing multi-bit groups of transition bits comprises constructing 4-bit groups of transition bits individually indicating data transition locations a corresponding 4-bit group of sampled bits.

3. The method of claim 1, comprising:
   detecting at least one pattern in the multi-bit groups of transition bits; and
   deriving the clock data based on the at least one pattern in the multi-bit groups of transition bits.

4. The method of claim 1, wherein deriving the clock data comprises
   identifying a given transition in a current multi-bit group of transition bits as a mid-bit if no transitions occurred in two previous multi-bit groups of transition bits.

5. The method of claim 4, wherein deriving the clock data comprises identifying a given transition in a current multi-bit group of transition bits as a mid-bit if a transition is indicated in a most significant bit in a second previous multi-bit group of transition bits and a transition is indicated in a least significant bit in the current multi-bit group of transition bits.

6. The method of claim 1, wherein deriving the clock data comprises
   identifying a given transition in a current multi-bit group of transition bits as a mid-bit if a transition is indicated in a most significant bit in a second previous multi-bit group of transition bits and a transition is indicated in a least significant bit in the current multi-bit group of transition bits.

7. A non-transitory computer readable medium with computer executable instructions for deriving clock data from a Manchester coded serial data stream, the computer readable medium comprising computer executable instructions for:
   receiving a Manchester coded serial data stream corresponding to an input baud rate;
   quadrature sampling the Manchester coded serial data stream at a sample rate higher than the input baud rate to obtain 4-bit groups of sampled bits;
   constructing 4-bit groups of transition bits, the 4-bit groups of transition bits individually indicating data transition locations in a corresponding 4-bit group of sampled bits; and deriving the clock data based solely on the 4-bit groups of transition bits.

8. The non-transitory computer readable medium of claim 7, comprising computer executable instructions for:
selectively generating clock data edges in the clock data based at least partially on transitions identified as mid-bits associated with transitions between received data bits; and
identifying a given transition in a current 4-bit group of transition bits as a mid-bit if no transitions occurred in the two previous 4-bit groups of transition bits.

9. The non-transitory computer readable medium of claim 7, comprising computer executable instructions for:
identifying a given transition in a current 4-bit group of transition bits as a mid-bit if a transition is indicated in a most significant bit in a second previous 4-bit group of transition bits and a transition is indicated in a least significant bit in the current 4-bit group of transition bits.

10. The non-transitory computer readable medium of claim 7, comprising computer executable instructions for:
selectively generating clock data edges in the clock data based at least partially on transitions identified as mid-bits associated with transitions between received data bits; and
identifying a given transition in a current 4-bit group of transition bits as a mid-bit if a transition is indicated in a most significant bit in a second previous 4-bit group of transition bits and a transition is indicated in a least significant bit in the current 4-bit group of transition bits.

11. A receiver for processing a Manchester coded serial data stream, the receiver comprising:
a sampling circuit operative to sample the Manchester coded serial data stream at a sample rate higher than an input baud rate to obtain multi-bit groups of sampled bits;
a transition circuit operative to generate multi-bit groups of transition bits, the individual groups of transition bits indicating data transition locations in a corresponding multi-bit group of sampled bits; and
a clock data recovery circuit operative to generate clock data based solely on the multi-bit groups of transition bits by selectively generating clock data edges in the clock data based at least partially on transitions identified as mid-bits associated with transitions between received data bits.

12. The receiver of claim 11, wherein the clock data recovery circuit comprises a logic circuit operative to detect at least one pattern in the multi-bit groups of transition bits, and to derive the clock data based on the at least one pattern in the multi-bit groups of transition bits.

13. The receiver of claim 11, wherein the logic circuit is operative to identify a given transition in a current multi-bit group of transition bits as a mid-bit if no transitions occurred in two previous multi-bit groups of transition bits.

14. The receiver of claim 13, wherein the logic circuit is operative to identify a given transition in a current multi-bit group of transition bits as a mid-bit if a transition is indicated in a most significant bit in a second previous multi-bit group of transition bits and a transition is indicated in a least significant bit in the current multi-bit group of transition bits.

15. The receiver of claim 11, wherein the logic circuit is operative to identify a given transition in a current multi-bit group of transition bits as a mid-bit if a transition is indicated in a most significant bit in a second previous multi-bit group of transition bits and a transition is indicated in a least significant bit in the current multi-bit group of transition bits.

16. A motor drive, comprising:
power conversion circuitry operative to receive input power from a power source and to provide output power to drive a motor load; and
a receiver for processing a Manchester coded serial data stream received by the motor drive, the receiver comprising:
a sampling circuit operative to sample the Manchester coded serial data stream at a sample rate higher than an input baud rate to obtain multi-bit groups of sampled bits;
a transition circuit operative to generate multi-bit groups of transition bits, individual groups of transition bits indicating data transition locations in a corresponding multi-bit group of sampled bits; and
a clock data recovery circuit operative to generate clock data based solely on the multi-bit groups of transition bits.

17. The motor drive of claim 16, wherein the clock data recovery circuit comprises a logic circuit operative to detect at least one pattern in the multi-bit groups of transition bits, and to derive the clock data based on the at least one pattern in the multi-bit groups of transition bits.

18. The motor drive of claim 17, wherein the logic circuit is operative to selectively generate clock data edges in the clock data based at least partially on transitions identified as mid-bits associated with transitions between received data bits, and to identify a given transition in a current multi-bit group of transition bits as a mid-bit if no transitions occurred in the two previous multi-bit groups of transition bits.

19. The motor drive of claim 18, wherein the logic circuit is operative to identify a given transition in a current multi-bit group of transition bits as a mid-bit if a transition is indicated in a most significant bit in a second previous multi-bit group of transition bits and a transition is indicated in a least significant bit in the current multi-bit group of transition bits.

20. The motor drive of claim 17, wherein the logic circuit is operative to selectively generate clock data edges in the clock data based at least partially on transitions identified as mid-bits associated with transitions between received data bits, and to identify a given transition in a current multi-bit group of transition bits as a mid-bit if a transition is indicated in a most significant bit in a second previous multi-bit group of transition bits and a transition is indicated in a least significant bit in the current multi-bit group of transition bits.

* * * * *